(12) United States Patent
Steinmeyer et al.

(10) Patent No.: US 7,285,881 B2
(45) Date of Patent: Oct. 23, 2007

(54) SUPERCONDUCTING DEVICE COMPRISING A COOLING UNIT FOR COOLING A ROTATING, SUPERCONDUCTIVE COIL

(75) Inventors: Florian Steinmeyer, Herzogenaurach (DE); Elmar Trautenberg, deceased, late of Fürth (DE); by Carla Brigitte Trautenberg, legal representative, Fürth (DE); by Ulrich Trautenberg, legal representative, Fürth (DE); by Elke Trautenberg, legal representative, Fürth (DE); Peter Van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 548 days.

(21) Appl. No.: 10/344,943

(22) PCT Filed: Aug. 3, 2001

(86) PCT No.: PCT/DE01/02977

§ 371 (c)(1),
(2), (4) Date: Sep. 8, 2003

(87) PCT Pub. No.: WO02/15370

PCT Pub. Date: Feb. 21, 2002

(65) Prior Publication Data
US 2006/0158059 A1    Jul. 20, 2006

(30) Foreign Application Priority Data
Aug. 16, 2000    (DE) ................................ 100 39 964

(51) Int. Cl.
*H02K 55/00*    (2006.01)
*H02K 55/04*    (2006.01)

(52) U.S. Cl. .......................................... 310/52; 310/55
(58) Field of Classification Search ................ 310/261, 310/52
See application file for complete search history.

(56) References Cited

U.S. PATENT DOCUMENTS 3,000,322 A * 9/1961 White ...................... 417/410.3

(Continued)

FOREIGN PATENT DOCUMENTS

EP    0 789 368 A1    8/1997

(Continued)

OTHER PUBLICATIONS

Haruyama et al., "Proceedings of the Sixteenth International Cryogenic Engineering Conference/International Cryogenic Materials Conference," Part 1, May 20-24, 1996, Kitakushu, Japan, pp. 1109-1129, Elsevier Science, 1997.

*Primary Examiner*—Darren Schuberg
*Assistant Examiner*—Ondria Garner
(74) *Attorney, Agent, or Firm*—Staas & Halsey LLP

(57) ABSTRACT

The supraconductor device contains a rotor, which can rotate about a rotational axis, with a supraconductive coil in a heat conducting coil support. The coil support comprises a central cylindrical cavity. A cooling head, which is located outside of the rotor, of a cooling unit is connected in a heat conductive manner to a heat transfer body, which projects into the cavity of the coil support while remaining stationary. An annular gap located between the coil support and the heat transfer body is filled with a heat conducting contact gas.

24 Claims, 4 Drawing Sheets

U.S. PATENT DOCUMENTS

| | | | | |
|---|---|---|---|---|
| 3,934,163 A * | 1/1976 | Mailfert | 310/10 |
| 4,039,870 A * | 8/1977 | Sterrett | 310/52 |
| 4,117,357 A * | 9/1978 | Baumann | 310/52 |
| 4,171,494 A * | 10/1979 | Yamaguchi et al. | 310/52 |
| 4,250,418 A * | 2/1981 | Eckels | 310/64 |
| 4,328,437 A * | 5/1982 | Inticbar et al. | 310/52 |
| 4,448,042 A * | 5/1984 | Yamaguchi et al. | 62/505 |
| 4,583,014 A * | 4/1986 | Murphy et al. | 310/52 |
| RE33,186 E * | 3/1990 | Mori et al. | 148/409 |
| 4,914,328 A * | 4/1990 | Hooper et al. | 310/52 |
| 5,350,958 A * | 9/1994 | Ohnishi | 310/52 |
| 5,482,919 A * | 1/1996 | Joshi | 310/52 |
| 5,774,032 A * | 6/1998 | Herd et al. | 335/216 |
| 5,880,547 A * | 3/1999 | Shoykhet | 310/91 |
| 5,952,748 A * | 9/1999 | Boldlehner | 310/54 |
| 6,169,352 B1 | 1/2001 | Hull | |
| 6,351,045 B1 * | 2/2002 | Shoykhet | 310/52 |
| 6,376,943 B1 * | 4/2002 | Gamble et al. | 310/52 |
| 6,489,701 B1 * | 12/2002 | Gamble et al. | 310/179 |
| 6,727,609 B2 * | 4/2004 | Johnsen | 310/52 |
| 6,727,633 B2 * | 4/2004 | Laskaris et al. | 310/270 |
| 6,777,841 B2 * | 8/2004 | Steinmeyer | 310/90.5 |
| 2003/0184176 A1 * | 10/2003 | Steinmeyer | 310/90.5 |
| 2004/0056541 A1 * | 3/2004 | Steinmeyer | 310/52 |
| 2004/0090139 A1 * | 5/2004 | Wang | 310/261 |
| 2005/0160744 A1 * | 7/2005 | Frank et al. | 62/6 |
| 2006/0082228 A1 * | 4/2006 | Urbahn et al. | 310/52 |

FOREIGN PATENT DOCUMENTS

| | | | |
|---|---|---|---|
| EP | 0789368 A1 * | 8/1997 | |
| GB | 2339975 A * | 2/2000 | |
| JP | 55053173 A * | 4/1980 | |
| JP | 57028540 A * | 2/1982 | |
| JP | 57097340 A * | 6/1982 | |
| JP | 58029367 A * | 2/1983 | |
| JP | 1-129766 | 5/1989 | |
| JP | 01144356 A * | 6/1989 | |
| JP | 3-284156 | 12/1991 | |
| JP | 04331457 A * | 11/1992 | |
| JP | 06303760 A * | 10/1994 | |
| JP | 08066003 A * | 3/1996 | |
| JP | 11-318071 | 11/1999 | |
| JP | 2006230191 A * | 8/2006 | |
| WO | WO 00/13296 | 3/2000 | |
| WO | WO A 00/13296 * | 3/2000 | 310/52 |

* cited by examiner

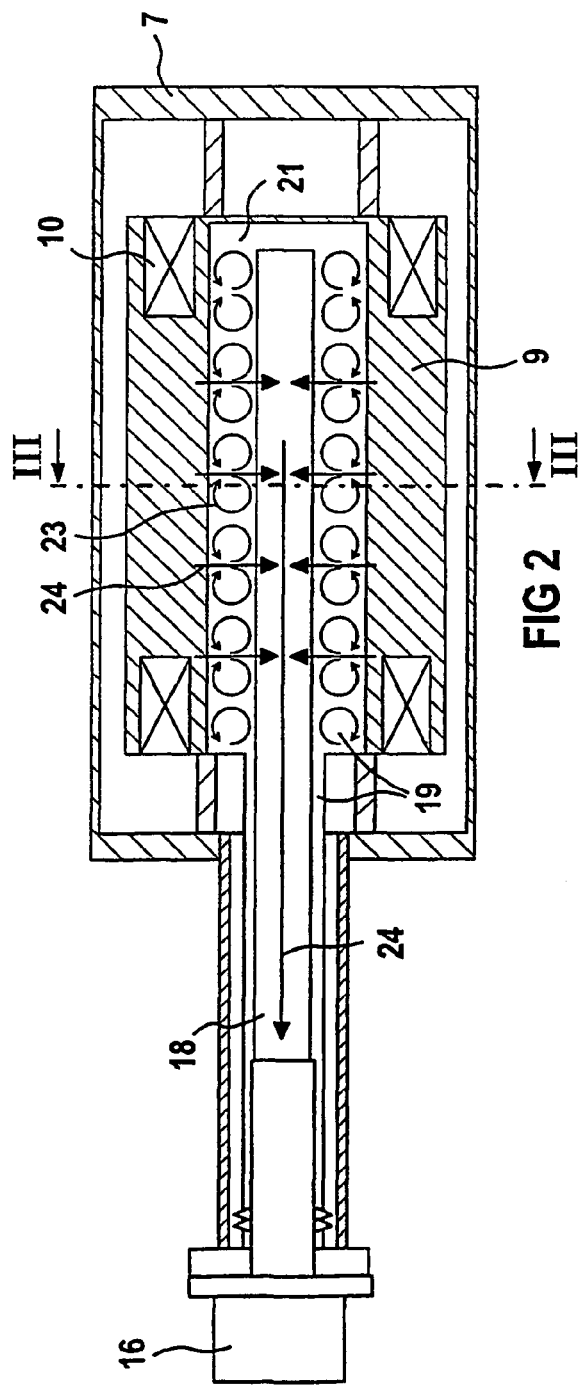
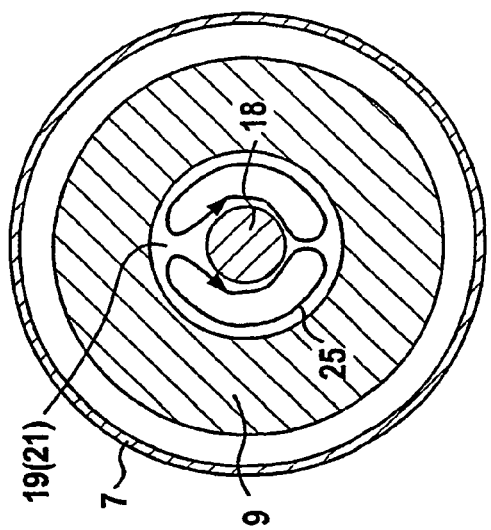

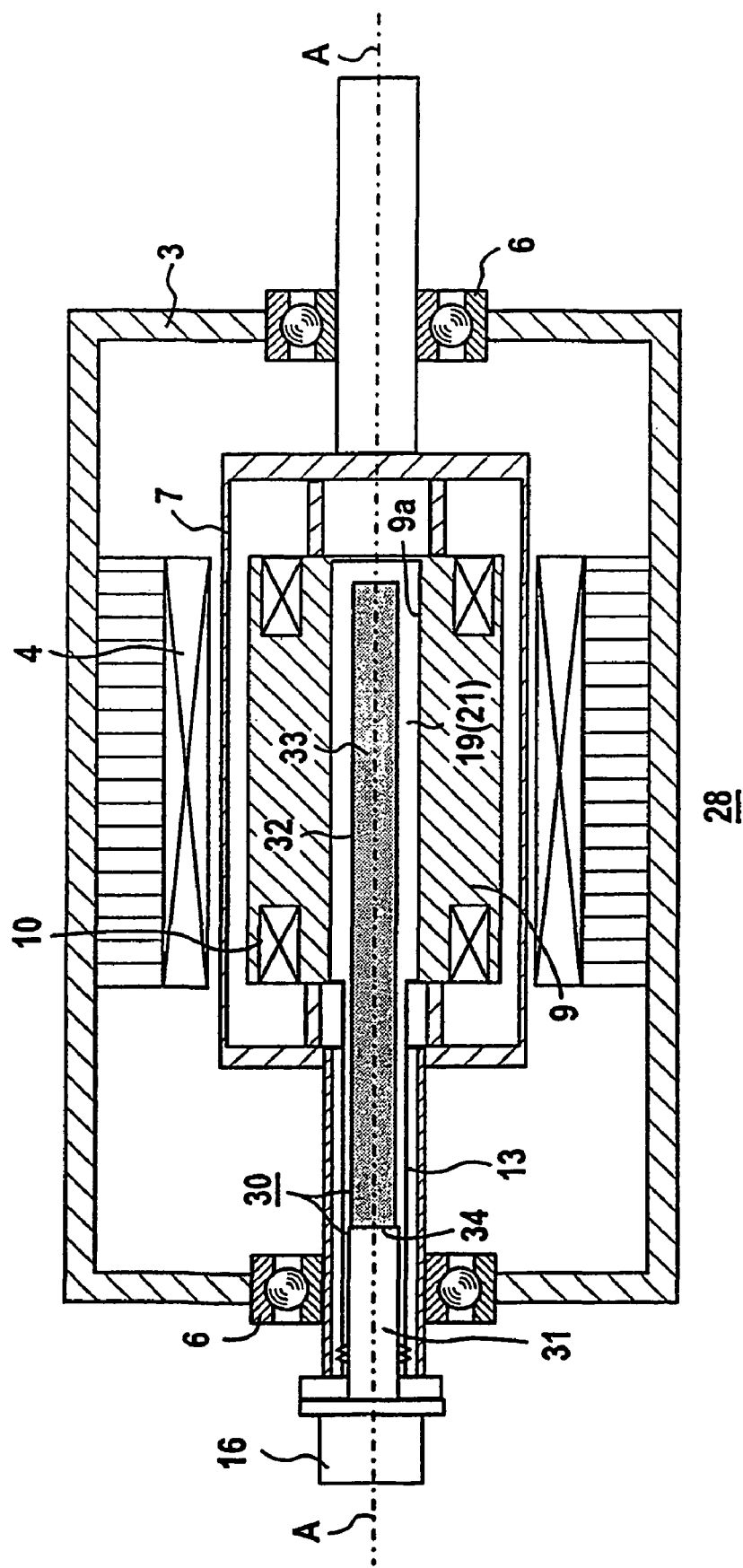

SUPERCONDUCTING DEVICE COMPRISING A COOLING UNIT FOR COOLING A ROTATING, SUPERCONDUCTIVE COIL

CROSS REFERENCE TO RELATED APPLICATIONS

This application is based on and hereby claims priority to PCT Application No. PCT/DE01/02977 filed on 3 Aug. 2001 and German Application No. 100 39 964.9 filed on 16 Aug. 2000, the contents of which are hereby incorporated by reference.

BACKGROUND OF THE INVENTION

The invention relates to a superconducting device having a rotor which is mounted such that it can rotate about a rotation axis and has at least one superconducting winding, whose conductors are arranged in a thermally conductive winding mount, and having a cooling unit which has at least one cooling head that is thermally coupled to the winding. A corresponding device is disclosed in U.S. Pat. No. 5,482, 919 A.

In addition to metallic superconductor materials such as NbTi or $Nb_3Sn$ which have been known for a very long time and have a very low critical temperatures $T_c$ and are therefore also referred to as low-$T_c$ superconductor materials or HTS materials, metal-oxidic superconductor materials have been known since 1987, with critical temperatures above 77 K. The latter materials are also referred to as high-$T_c$ superconductor materials or HTS materials and, in principle, allow a cooling technique using liquid nitrogen ($LN_2$).

Attempts have also been made to produce superconducting windings by conductors using such HTS materials. However, it has been found that already known conductors have only a comparatively low current-carrying capacity in magnetic fields with inductions in the Tesla range. This often makes it necessary for the conductors of such windings nevertheless to have to be kept at a temperature level below 77 K, for example between 10 and 50 K, despite the intrinsically high critical temperatures of the materials used, in order to make it possible to carry significant currents in this way in field strengths of several Tesla. A temperature level such as this is admittedly on the one hand considerably greater than 4.2 K, the boiling temperature of the liquid helium (LHe) with which known metallicauperconductor materials such as $Nb_3Sn$ are cooled. On the other hand, however, cooling with $LN_2$ is uneconomic owing to the high conductor losses. Other liquefied gases such as hydrogen with a boiling temperature of 20.4 K or Neon with a boiling temperature of 27.1 K cannot be used, owing to their danger or owing to their lack of availability.

Cooling units in the form of cryogenic coolers with closed helium compressed-gas circuits are therefore preferably used for cooling windings with HTS conductors in the stated temperature range. Cryogenic coolers such as these are, in particular, of the Gifford-McMahon or Stirling type, or are in the form of so-called pulsed-tube coolers. Cooling units such as these also have the advantage that the cooling performance is available just by pushing a button, avoiding the need for the user to handle cryogenic liquids. When using cooling units such as these, a superconducting device such as a magnet coil or a transformer winding is cooled only indirectly by thermal conduction to a cooling head of a refrigerator (see, for example, "Proc. 16th Int. Cryog. Engng. Conf. (ICEC 16)", Kitakyushu, J P, 20.-24.05.1996, Publisher Elsevier Science, 1997, pages 1109 to 1129).

A corresponding cooling technique is also envisaged for the superconducting rotor of an electrical machine as disclosed in the initially cited US-A document. The rotor contains a rotating winding composed of HTS conductors, which can be cooled to a desired operating temperature of between 30 and 40 K by a cooling unit in the form of a Stirling, Gifford-McMahon or pulsed tube cooler. For this purpose, one specific embodiment of the cooling unit contains a cooling head which also rotates but is not described in any more detail in the documents, and whose cold side is thermally coupled indirectly to the winding via thermally conductive elements. The cooling unit of the known machine also contains a compressor unit which is located outside its rotor and supplies the cooling head with the necessary operating gas via a rotating coupling, which is not described in any more detail, of a corresponding transfer unit. The coupling also supplies the necessary electrical power to a valve drive (which is integrated in the cooling head) for the cooling unit, via two sliprings. This concept makes it necessary for at least two gas connections to be routed coaxially in the transfer unit, and means that at least two electrical sliprings must be provided. Furthermore, the accessibility to those parts of the cooling unit which also rotate, and in particular to the parts of the valve drive in the rotor of the machine, is impeded since the rotor housing must be opened for the necessary maintenance operations. In addition, the operation of a known valve drive is not ensured at high rotation speeds, such as those which occur in synchronous motors or generators.

Against the background of the related art, one possible object for the present invention is to refine the device having the features mentioned initially such that it allows the cooling unit to be operated reliably, safely and economically both when at rest and when the rotor is rotated in a temperature range below 77 K, with comparatively less hardware complexity.

The superconducting device accordingly comprises a rotor which is mounted such that it can rotate about a rotation axis and has at least one superconducting winding, whose conductors are arranged in a thermally conductive winding mount, as well as a cooling unit which has at least one cooling head that is thermally coupled to the winding. In this case, the superconducting device is intended to have the following features, namely that the winding mount is equipped with a central, cylindrical cavity which extends in the axial direction, in that the cooling head is located in a fixed position outside the rotor and is rigidly and thermally conductively connected to a heat transmission cylinder, which projects into the cavity of the winding body while maintaining a hollow cylindrical annular gap, and in that the annular gap is filled, at least in the area of the winding mount, with a contact gas for heat transmission between the winding mount and the heat transmission cylinder, and is sealed in a gastight manner.

In consequence, in the refinement of the superconducting device, the entire cooling unit is arranged with its possibly moving parts in a fixed position outside the rotor, and is thus easily accessible at all times. The cooling performance and the heat transfer are provided by a fixed cooling finger in the form of the heat transmission cylinder, which is thermally highly conductively connected to the cooling head, by the gas flow of the contact gas to the rotating winding mount. In this case, one advantageous feature is that no forced circulation of the contact gas is used; instead, the rotation of the rotor together with the centrifugal forces in the contact gas ensures convection of the gas. Furthermore, even when the rotor is stationary, the convection that occurs in the contact gas makes it possible to cool down from room temperature to low temperature or to maintain the low temperature conditions in the rotor. This is a consequence of the chosen geometry of the structure of the heat transmission cylinder in the cylindrical cavity while maintaining the annular gap. The heat transfer and the provision of the cooling performance with this structure are particularly simple and economic and, furthermore, only a comparatively simple seal is required for the annular gap.

The annular gap can thus be sealed particularly easily if the cavity is closed on one side by the winding mount and a sealing device with parts that also rotate is provided on the side facing the cooling head. In this case, at least one seal from the group of ferrofluid seal, labyrinth seal, gap seal may preferably be used as the sealing device.

Virtually all types of cooling unit may be provided which have a cooling head which can be reduced to a predetermined temperature level. Cryogenic coolers are preferably provided, in particular with a closed helium compressed-gas circuit, since these have a simple design and are particularly suitable for an indirect cooling technique such as that used for the superconducting device. Appropriate coolers, which are also referred to as regenerative cryogenic coolers, have a regenerator or regenerative operating cycle corresponding to the normal classification for cryogenic coolers (see, for example, the cited Proceedings volume, pages 33 to 44).

It is particularly advantageous for the cooling head to have a plurality of stages. Parts of an electrical power supply or a thermal radiation shield can be reduced to a comparatively high intermediate temperature by its first stage. An appropriately designed cooling head thus in each case allows even stationary parts of a semiconductor device to be kept at a temperature level that is suitable for effective cooling, in a simple manner.

It may also be regarded as being advantageous for the winding to be cooled and hence its superconductor material to be kept at a temperature below 77 K by the cooling head, and preferably at between 20 and 50 K when using HTS material. This is because known HTS materials have a critical current density which is sufficient for normal applications in this temperature range, which can be maintained with a relatively restricted amount of cooling. The necessary cooling power can be applied without any problems for the superconducting device. By way of example, it is in the range of a few tens of watts at 20 K to 30 K for a synchronous machine in the order of magnitude of a mechanical power of about 1 to 20 MW.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 2 and 3 show the operating mode and cooling mode, respectively, of the rotor shown in FIG. 1, in the form of a longitudinal section and cross section, respectively, and FIGS. 4 and 5 show two further embodiments of superconducting devices with a rotor and cooling unit, in each case in the form of a longitudinal section.

DETAILED DESCRIPTION OF THE PREFERRED EMBODIMENT

Figure 1:
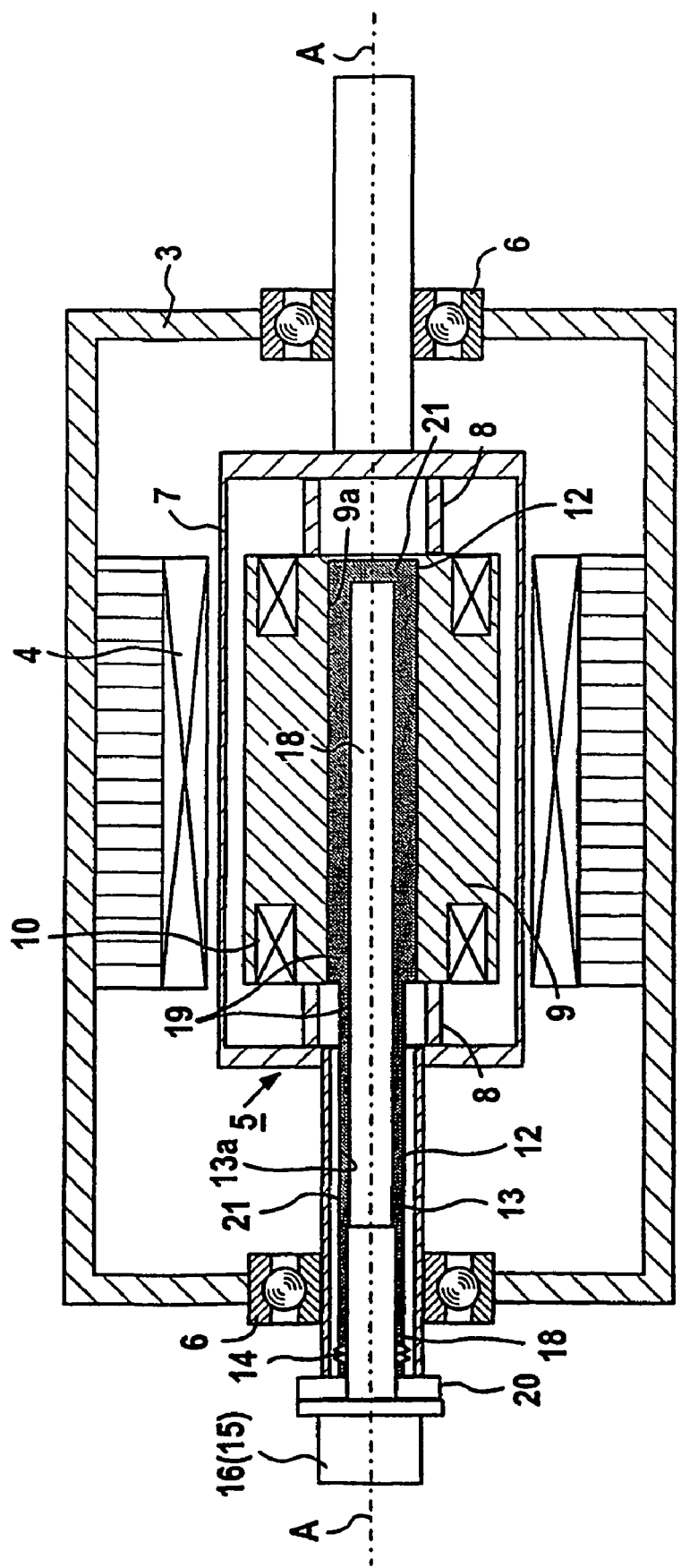
FIG. 1 shows a first embodiment of a superconducting device having a rotor and an associated cooling unit, in the form of a longitudinal section.

Reference will now be made in detail to the preferred embodiments of the present invention, examples of which are illustrated in the accompanying drawings, wherein like reference numerals refer to like elements throughout.

In this case, corresponding parts are provided with the same reference symbols in the figures.

The embodiments (which are described in the following text with reference to the figures) of superconducting devices may each in particular be a synchronous motor or a generator. The superconducting device comprises a rotating, superconducting winding which, in principle, allows the use of LTS material or HTS material. The latter material is assumed to have been chosen for the following exemplary embodiments. The winding may comprise a coil or else a system of coils in a 2-pole, 4-pole or multi-pole arrangement. The basic design of such a superconducting device which, for example, forms a synchronous machine can be seen from FIG. 1, with this being based on known embodiments of such machines (see, for example, the initially cited US-A document). The device, which is annotated in general by 2, comprises a stationary outer housing 3 which is at room temperature and has a stator winding 4. A rotor 5 is mounted within the outer housing, and surrounded by the stator winding 4, in bearings 6 such that it can rotate about a rotation axis A. The rotor has a vacuum vessel 7 in which a winding mount 9 with an HTS winding 10 is held on, for example, hollow-cylindrical torque-transmitting suspension elements 8. A cylindrical cavity 12 which extends in the axial direction is provided concentrically with respect to the rotation axis A in this winding mount. The winding mount is in this case designed to be vacuum-tight with respect to this cavity. The cavity advantageously extends axially into an area outside the outer housing 3. This is achieved by a vacuum-tight neck tube 13 which is arranged to be concentric with respect to the axis, passes outward from the area of the winding mount and is equipped on its warmer side, facing away from the winding mount, with an expansion bellows 14 for length compensation.

The superconducting device 2 furthermore has a cooling unit 15, of which only a cooling head 16 is illustrated, for indirect cooling of the winding 10 via thermally conductive elements. The cooling unit may, in particular, be a cryogenic cooler of the Gifford-McMahon type. A pulsed tube cooler or split Stirling cooler is preferably chosen as a regenerative cryogenic cooler. In this case, the cooling head 16 and hence all the essential further parts of the cooling unit 15 should be located outside the rotor 5 and outside the outer housing 3. Additional parts which are required for the cooling unit together with the cooling head that is to be used, such as hot pressure-equalizing containers, filling capillaries, overpressure valves for protecting the system against overpressure when it heats up, are not shown in the figure, but are generally known. The cooling part of the illustrated cooling head 16 should be connected in a highly thermally conductive manner to a heat transmission body 18 which is, in particular, cylindrical. This heat transmission body projects through the neck tube 13 into the cavity 12 in the winding mount 9, with a hollow-cylindrical annular gap 19 being maintained with respect to the wall 13a of the neck tube and the wall 9a of the cavity. This annular gap has a considerably larger cross section in the area of the winding mount than in the area of the neck tube. In order to provide a gastight seal for the annulargap, the cavity 12 in the winding mount 9 is closed by the winding mount itself on the side facing away from the cooling head 16. Since the cavity extends beyond the neck tube 13 through the outer housing 3 into the area of the cooling head 16 outside, the annular gap can advantageously be sealed there. A sealing device 20, which is not shown in any more detail in the figure, having at least one seal is provided for this purpose, and may be a ferrofluid seal and/or a labyrinth seal and/or a gap seal. The annular gap 19 is filled with a contact gas 21, preferably helium or else, for example, with neon for operating temperatures above 30 K. By way of example, the pressure is between 10 and 1000 mbar. This contact gas produces a thermal contact between the heat transmission body 18 and the wall of the winding former 9 which bounds the cavity 12. The winding former should be designed to be sufficiently thermally conductive, that is to say it has highly thermally conductive parts between the wall 9a and the winding 10. The winding is in this way thermally coupled in a simple manner to the cooling head 16 of the cooling unit via the winding former 9, the contact gas 21 and the heat transmission body 18. In order to improve the heat transmission between the heat transmission body 18 and the winding mount 9, measures which enlarge the heat interchanging surface areas with the contact gas 21 may be provided, for example a system of ribs in the circumferential direction on the wall 9a or on the opposite outer face of the heat transmission body 18.

Thermally highly conductive metals such as aluminum or copper may be used as the material for the cylindrical heat transmission body 18. If relatively strong fields, which would lead to unacceptable eddy current heating, are pressed in the interior of the motor or in its outer housing 3, it is advantageous to institute countermeasures. For this purpose, the heat transmission body 18 may be composed of a non-conductive material such as a ceramic, for example $Al_2O_3$ or aluminum nitride, or monocrystalline sapphire material. It may also be composed of elements which are electrically insulated from one another, or bonded such that they are pressed against one another and run essentially axially, in one dimension. Elements such as these may be ribbons, metal sheets, wires such as varnished copper wires, or meshed braids.

FIG. 2 shows the heat transmission between the heat transmission body 18 and the inner face of the winding mount 9 during rotation: heat from the sufficiently thermally conductive winding mount 9 is passed to its inner wall, which bounds the cavity 12, at about 10 to 70 K, depending on the HTS material that is used. Heat transmission takes place there to the contact gas 21 which also rotates in the edge layer, heating the contact gas. The reduced density of the hot gas and the lower centrifugal force result in lifting in the direction of the rotor axis A. There, the gas strikes the colder heat transmission body 18 and emits heat, cooling it down. In the process, it becomes denser and is thus moved outward again owing to the higher centrifugal force. The corresponding convection vortexes 23, which are indicated in the figure, in this case run in the circumferential direction. The figure also shows the heat flow which occurs by arrowed lines 24.

FIG. 3 shows a cross section through the rotor 5, which is shown in FIG. 2, along a section line III-III' for the situation where the rotor 5 is stationary or is in the cooling-down mode, so that there is no centrifugal force. In this case, the illustrated convention vortexes or cells 25 are formed in the axial direction in the contact gas, allowing cooling down from room temperature or maintenance of a cryogenic state when the rotor is in the standby mode.

The superconducting device 28 which is illustrated in FIG. 4 (which corresponds to FIG. 1) differs from the superconducting device 2 shown in FIG. 1 essentially only in the configuration of the central heat transmission body. In this case, this heat transmission body, which is annotated in general by 30, is subdivided into two parts which are arranged axially one behind the other, with a solid part 31 being adjacent to the cooling head 16 and projecting only by a small amount into the interior of the outer housing 3. At least in the area of the winding mount 9, the heat transmission body is essentially internally hollow, for example, being in the form of a thin-walled VA, brass, copper or aluminum vessel, and being intended to transport heat as a heat tube 32 based on the heat pipe or thermosiphon principle. For this purpose, the heat tube 32 is filled with a heat transport gas 33 such as neon. In this case, heat is conveyed by vaporization and condensation of the heat transport gas, for example using neon at 27 K, with the condensation taking place on the boundary surface 34 between the solid part 31 and the heat tube 32. To provide better assistance to the liquid phase within the tube 32, this tube 32 may also be equipped in a manner known per se with fittings in the form of a wick, for example with a stainless steel wire mesh.

In this embodiment of the superconducting device 28 as shown in FIG. 4, the heat transfer thus takes place by the contact gas 21 between the winding mount wall 9a and the solid part 31, which is thermally connected to the cooling head 16 of the cooling device, of the heat transmission body essentially indirectly. In fact, the heat transport gas 33 is introduced into the heat transfer path, so that indirect cooling of the contact gas 21 is in this case provided by the cold solid part 31.

Figure 5:
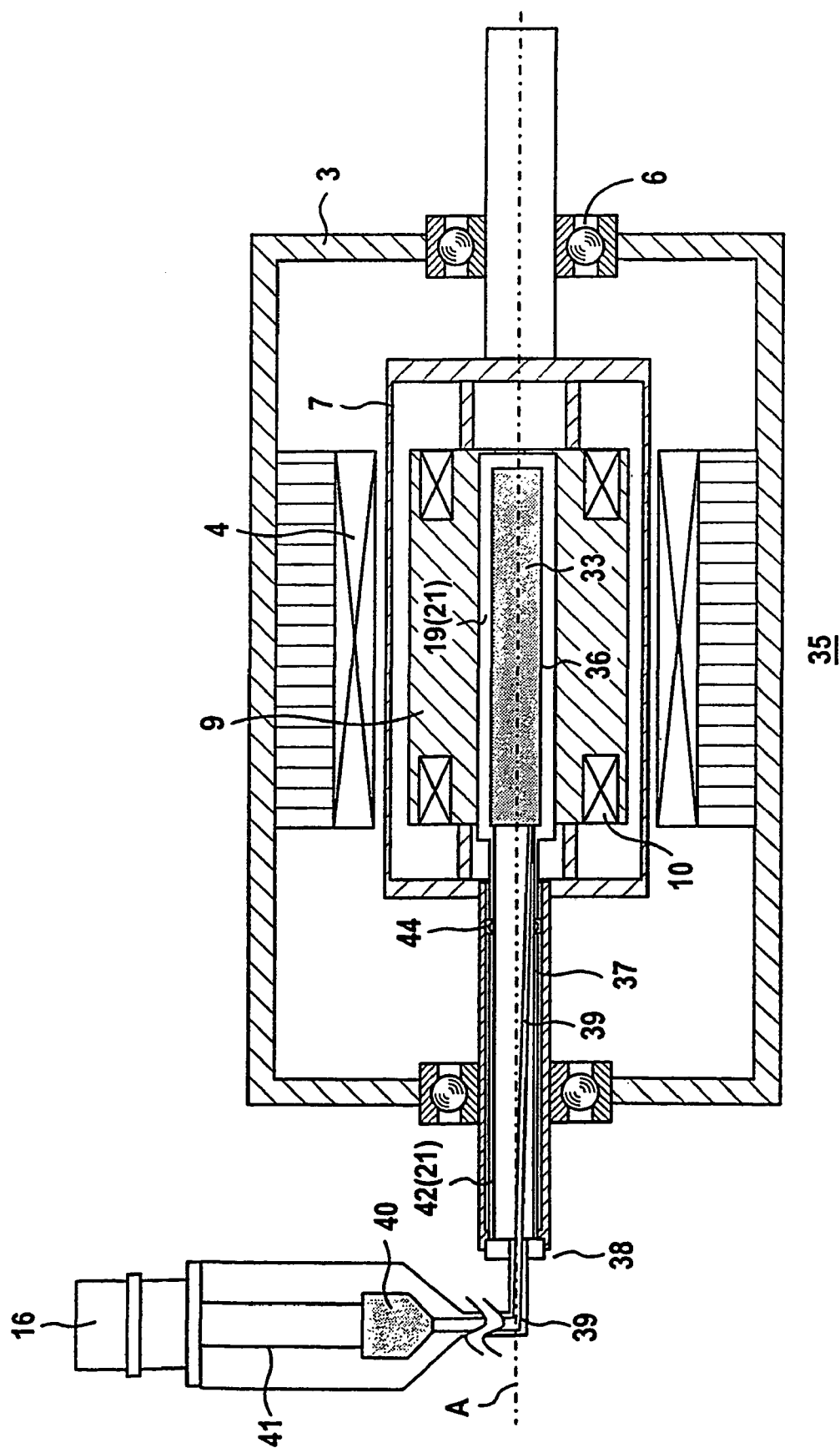

A development of the superconducting device as shown in FIG. 4 with such indirect cooling of the contact gas is illustrated in FIG. 5. In this superconducting device, which is annoted 35, the cooling head 16 of a cooling unit is drawn out from the hollow shaft at the side for example by 0.5 m to quite a few meters. A heat tube 36 in the area of the winding 10 is filled with a heat transport gas 33 such as neon on the basis of the head-pipe principle. This is lengthened at the side as far as a sealing device 38 outside the outer housing 3, via a vacuum-insulated supporting tube 37. Together with a concentrically arranged additional tube, this supporting tube forms a thin gas gap 42 through which the contact gas 21 passes as far as the sealing device 38, so that it also produces the seal there for the annular gap 19 holding the contact gas 21. A thin, fixed connecting line 39, which passes through the sealing device 38, is provided for feeding the heat transport gas 33 into the interior of the heat tube 36. This vacuum-insulated connecting line leads outward to a condenser 40, which makes thermal contact with a cooling head 16 of a cooling unit via a heat transmission body 41. This results in a thermal connection between that part of the heat transport gas 33 that is located in the heat tube 36 and the cooling head 16 via the heat transmission body 41, the condenser 40 and that part of the heat transport gas which is located in the connecting tube 39. As is also indicated in the figure, a supporting bearing 44 may be provided in order to prevent vibration of the relatively long supporting tube 37, which is rigidly connected to the heat tube 36. The advantage of this embodiment of the superconducting device is that the cooling head can be mounted at any desired point, is easier to maintain, and the sealing device 38 can be designed to be smaller.

The invention has been described in detail with particular reference to preferred embodiments thereof and examples, but it will be understood that variations and modifications can be effected within the spirit and scope of the invention.

The invention claimed is:

1. A superconducting device, comprising:
 a rotor which is mounted such that it can rotate about a rotation axis, the rotor comprising:
  a thermally conductive winding mount having a central cylindrical cavity which extends in a direction of the rotation axis; and
  at least one superconducting winding having conductors arranged in the thermally conductive winding mount;
  wherein the central cylindrical cavity substantially projects through an entire length of the winding mount, the central cylindrical cavity being closed on one end by the winding mount,
 a cooling unit having at least one cooling head, the cooling unit and the cooling head being located in a fixed position outside the rotor;
 a fixed heat transmission cylinder rigidly and thermally conductively connected to the cooling head of the cooling unit, the fixed heat transmission cylinder projecting into the central cylindrical cavity of the winding mount so as to maintain a hollow-cylindrical annular gap between the winding mount and the fixed heat transmission cylinder; and
 a contact gas retained within at least a portion of the annular gap for heat transmission between the winding mount and the heat transmission cylinder
 wherein the heat transmission cylinder is closed at an end projecting into the winding mount, the annular gap being sealed on a side facing the cooling head by a sealing device having parts which rotate with the rotor.

2. The device as claimed in claim 1, wherein the sealing device has at least one seal selected from the group consisting of a ferrofluid seal, a labyrinth seal, and a gap seal.

3. The device as claimed in claim 1, wherein the heat transmission cylinder is a hollow heat tube filled with a heat transport gas to produce a thermal connection between the coaling head and the contact gas located in the annular gap.

4. The device as claimed in claim 3, wherein
 a housing encases the rotor,
 the cooling head is located out of the housing, and
 the heat transmission cylinder has a solid part which projects from the cooling head into the housing, and has the heat tube extending from the solid part, into central cylindrical cavity.

5. The device as claimed in claim 3, wherein
 the heat tube occupies the entire axial length of the heat transmission cylinder, and
 a connecting line for the heat transport gas is provided outside the rotor, between the cooling head and the heat tube.

6. The device as claimed in claim 5, wherein the heat transport gas is thermally coupled to the cooling head via a condenser in the connecting line.

7. The device as claimed in claim 1, wherein the cooling unit has at least one cryogenic cooler.

8. The device as claimed in claim 7, wherein the cryogenic cooler is a regenerative cryogenic cooler.

9. The device as claimed in claim 7, wherein the cryogenic cooler is selected from the group consisting of a pulsed tube cooler, a split Stirling cooler, and a Gifford-McMahon cooler.

10. The device as claimed in claim 1, wherein the cooling head is a multistage cooling head.

11. The device as claimed in claim 10, wherein
 the cooling head has first and second cooling stages,
 the first cooling stage is thermally connected to an electrical power supply or to a radiation shield, and
 the second stage is thermally and rigidly connected to the heat transmission cylinder.

12. The device as claimed in claim 1, wherein the superconducting winding is kept at a temperature below 77° K. by the cooling head.

13. The device as claimed in claim 1, wherein the conductors of the winding contain a metallic low-$T_c$ superconductor material or a metal-oxidic high-$T_c$ superconductor material.

14. The device as claimed in claim 2, wherein the heat transmission cylinder is a hollow heat tube filled with a heat transport gas to produce a thermal connection between the cooling head and the contact gas located in the annular gap.

15. The device as claimed in claim 14, wherein
 a housing encases the rotor,
 the cooling head is located out of the housing, and
 the heat transmission cylinder has a solid part which projects from the cooling head into the housing, and has the heat tube extending from the solid part, into central cylindrical cavity.

16. The device as claimed in claim 14, wherein
 the heat tube occupies the entire axial length of the heat transmission cylinder, and
 a connecting line for the heat transport gas is provided outside the rotor, between the cooling head and the heat tube.

17. The device as claimed in claim 16, wherein the heat transport gas is thermally coupled to the cooling head via a condenser in the connecting line.

18. The device as claimed in claim 14, wherein the cooling unit has at least one cryogenic cooler.

19. The device as claimed in claim 18, wherein the cryogenic cooler is selected from the group consisting of a pulsed tubs cooler, a spilt Stirling cooler, and a Gifford-McMahon cooler.

20. The device as claimed in claim 19, wherein the cooling head is a multistage cooling head.

21. The device as claimed in claim 20, wherein
 the cooling head has first and second cooling stages,
 the first cooling stage is thermally connected to an electrical power supply or to a radiation shield, and
 the second stage is thermally and rigidly connected to the heat transmission cylinder.

22. The device as claimed in claim 21, wherein the superconducting winding is kept at a temperature below 77° K. by the cooling head.

23. The device as claimed in claim 22, wherein the conductors of the winding contain a metallic low-$T_c$ superconductor material or a metal-oxidic high-$T_c$ superconductor material.

24. A superconducting device, comprising:
 a rotor which is mounted such that it can rotate about a rotation axis, the rotor comprising:
  a thermally conductive winding mount having a cavity which extends in a direction of the rotation axis, the cavity substantially projecting through an entire length of the winding mount, the cavity being closed on one end by the winding mount; and
  at least one superconducting winding having conductors arranged in the thermally conductive winding mount;

a cooling head located in a fixed position outside the rotor;

a fixed hollow heat transmission body thermally conductively connected to the cooling head, the heat transmission body projecting into the cavity of the winding mount so as to maintain an annular gap between the winding mount and the heat transmission body, the heat transmission body being fixed to remain stationary while the rotor rotates; and a contact gas retained within at least a portion of the annular gap for heat transmission between the winding mount and the heat transmission body wherein the heat transmission body is closed at an end projecting into the winding mount, and the annular gap is sealed on a side facing the cooling heed by a sealing device having parts which rotate with the rotor.

* * * * *

UNITED STATES PATENT AND TRADEMARK OFFICE
CERTIFICATE OF CORRECTION

PATENT NO.        : 7,285,881 B2
APPLICATION NO.   : 10/344943
DATED             : October 23, 2007
INVENTOR(S)       : Florian Steinmeyer et al.

It is certified that error appears in the above-identified patent and that said Letters Patent is hereby corrected as shown below:

Title Page, Column 1 (Title), Line 1-4, item 54 change "SUPERCONDUCTING DEVICE COMPRISING A COOLING UNIT FOR COOLING A ROTATING, SUPERCONDUCTIVE COIL" to --SUPERCONDUCTING DEVICE HAVING A COOLING UNIT FOR COOLING A ROTATING, SUPERCONDUCTING WINDING--.

Title Page, Column 2 (Abstract), Line 1, item 57 change "supraconductor" to --superconductor--.

Title Page, Column 2 (Abstract), Line 2, item 57 change "supraconductive" to --superconductive--.

Column 1, Line 1-4, change "SUPERCONDUCTING DEVICE COMPRISING A COOLING UNIT FOR COOLING A ROTATING, SUPERCONDUCTIVE COIL" to --SUPERCONDUCTING DEVICE HAVING A COOLING UNIT FOR COOLING A ROTATING, SUPERCONDUCTING WINDING--.

Column 7, Line 42, change "coaling" to --cooling--.

Column 8, Line 40, change "tubs" to --tube--.

Column 8, Line 40, change "spilt" to --split--.

Column 10, Line 6, change "heed" to --head--.

Signed and Sealed this

Twentieth Day of May, 2008

JON W. DUDAS
*Director of the United States Patent and Trademark Office*